(12) United States Patent
Shi et al.

(10) Patent No.: US 8,124,202 B2
(45) Date of Patent: *Feb. 28, 2012

(54) MULTILAYER CONTAINER FOR ENHANCED GAS BARRIER PROPERTIES

(75) Inventors: Yu Shi, Branchburg, NJ (US); Xiaoyan Huang, Marietta, GA (US); Mikell Schultheis, Acworth, GA (US); Robert Kriegel, Decatur, GA (US); Francis M. Schloss, Perrysburg, OH (US)

(73) Assignee: The Coca-Cola Company, Atlanta, GA (US)

( * ) Notice: Subject to any disclaimer, the term of this patent is extended or adjusted under 35 U.S.C. 154(b) by 229 days.

This patent is subject to a terminal disclaimer.

(21) Appl. No.: 11/850,575

(22) Filed: Sep. 5, 2007

(65) Prior Publication Data

US 2008/0113134 A1    May 15, 2008

Related U.S. Application Data

(60) Provisional application No. 60/825,861, filed on Sep. 15, 2006.

(51) Int. Cl.
*B32B 1/02* (2006.01)
(52) U.S. Cl. ............... 428/35.7; 428/542.8; 426/112
(58) Field of Classification Search ........... 428/516, 428/35.7, 315.5, 480, 316.6, 542.8; 264/143, 264/239, 328.1, 513, 516; 426/112
See application file for complete search history.

(56) References Cited

U.S. PATENT DOCUMENTS

| 4,401,805 A | 8/1983 | Weemes et al. |
|---|---|---|
| 4,412,804 A | 11/1983 | Huther |
| 4,474,918 A | 10/1984 | Seymour et al. |
| 4,574,148 A | 3/1986 | Wicker et al. |
| 4,861,256 A | 8/1989 | Covey |
| 4,882,410 A | 11/1989 | Neugebauer et al. |
| 5,011,720 A | 4/1991 | Jabarin |
| 5,021,515 A | 6/1991 | Cochran et al. |
| 5,028,462 A * | 7/1991 | Matlack et al. ............. 428/35.7 |
| 5,095,001 A | 3/1992 | Miles et al. |
| 5,466,141 A | 11/1995 | Eckardt et al. |
| 5,473,161 A | 12/1995 | Nix et al. |
| 5,588,598 A | 12/1996 | Becker et al. |

(Continued)

FOREIGN PATENT DOCUMENTS

EP    0395237    10/1990

(Continued)

OTHER PUBLICATIONS

RD-230029 A, Published Jun. 1983.*

(Continued)

*Primary Examiner* — Rena Dye
*Assistant Examiner* — Ellen S Wood
(74) *Attorney, Agent, or Firm* — Sutherland Asbill & Brennan LLP (57) ABSTRACT

A multilayer container having enhanced gas barrier properties comprises at least two outer layers comprising a polymer matrix, and at least one barrier layer disposed between the at least two outer layers. The at least one barrier layer comprises a first polymer composition comprising a polymer matrix and a low molecular weight additive. In a particular embodiment, the low molecular weight additive comprises a purine derivative, such as caffeine, and is present in the multilayer container in an amount in the range of about 0.2 to about 10 weight percent of the container.

21 Claims, 3 Drawing Sheets

U.S. PATENT DOCUMENTS

| | | | |
|---|---|---|---|
| 5,662,926 A | 9/1997 | Wick et al. | |
| 5,679,373 A | 10/1997 | Wick et al. | |
| 5,700,554 A | 12/1997 | Speer et al. | |
| 5,744,056 A | 4/1998 | Venkateshwaran et al. | |
| 5,837,186 A | 11/1998 | Gotterbauer | |
| 5,888,598 A | 3/1999 | Brewster et al. | |
| 5,898,060 A | 4/1999 | Suzuki et al. | |
| 5,914,138 A | 6/1999 | Swenson | |
| 5,952,066 A | 9/1999 | Schmidt et al. | |
| 6,010,715 A | 1/2000 | Wick et al. | |
| 6,150,450 A | 11/2000 | Sekiyama et al. | |
| 6,150,454 A | 11/2000 | Wu et al. | |
| 6,320,014 B1 | 11/2001 | Takahashi et al. | |
| 6,548,133 B2* | 4/2003 | Schmidt et al. | 428/35.7 |
| 6,596,213 B2 | 7/2003 | Swenson | |
| 6,680,093 B1 | 1/2004 | Ries et al. | |
| 6,720,052 B1 | 4/2004 | Rule et al. | |
| 6,740,378 B1 | 5/2004 | Rule et al. | |
| 6,749,785 B2 | 6/2004 | Subramanian et al. | |
| 6,756,013 B1 | 6/2004 | Cornell et al. | |
| 6,808,753 B2 | 10/2004 | Rule et al. | |
| 6,811,826 B2 | 11/2004 | Rule et al. | |
| 6,982,119 B2 | 1/2006 | Shi et al. | |
| 2001/0033939 A1* | 10/2001 | Ohtsuka | 428/516 |
| 2002/0198331 A1 | 12/2002 | Nishihara et al. | |
| 2003/0194517 A1 | 10/2003 | Shi | |
| 2003/0194563 A1 | 10/2003 | Shi | |
| 2004/0091652 A1* | 5/2004 | Kikuchi et al. | 428/35.7 |
| 2004/0116619 A1 | 6/2004 | Moad et al. | |
| 2004/0247739 A1 | 12/2004 | Sabin et al. | |
| 2005/0082707 A1 | 4/2005 | Sabin et al. | |
| 2005/0100696 A1 | 5/2005 | Shi | |
| 2005/0118371 A1 | 6/2005 | Shi | |
| 2005/0153084 A1 | 7/2005 | Shi | |
| 2005/0196500 A1 | 9/2005 | Shi | |
| 2005/0221036 A1 | 10/2005 | Shi | |
| 2005/0260371 A1 | 11/2005 | Shi et al. | |
| 2005/0279707 A1 | 12/2005 | Matthews et al. | |
| 2005/0281969 A1 | 12/2005 | Shi | |
| 2006/0019045 A1* | 1/2006 | Bourgeois | 428/35.7 |
| 2006/0246242 A1 | 11/2006 | Siegel et al. | |
| 2006/0257602 A1 | 11/2006 | Shi | |
| 2006/0257603 A1 | 11/2006 | Shi et al. | |
| 2006/0275568 A1 | 12/2006 | Shi et al. | |
| 2007/0014953 A1 | 1/2007 | Siegel et al. | |
| 2007/0082156 A1 | 4/2007 | Shi et al. | |
| 2008/0113134 A1 | 5/2008 | Shi et al. | |

FOREIGN PATENT DOCUMENTS

| | | |
|---|---|---|
| EP | 0678554 | 10/1995 |
| GB | 1434828 | 5/1976 |
| JP | 5751455 | 3/1982 |
| JP | 5939547 | 3/1984 |
| JP | 61195155 | 8/1986 |
| JP | 53339357 | 12/1993 |
| JP | 2000212302 | 2/2000 |
| WO | 94/26622 | 11/1994 |
| WO | 01/12521 | 2/2001 |
| WO | 02/13612 | 2/2002 |
| WO | 2005/014254 | 2/2004 |
| WO | 2004/041496 | 5/2004 |
| WO | 2004/113414 | 12/2004 |

OTHER PUBLICATIONS

"Nylon-MXD6 (PA-MXD6)," posted at the Mitsubishi Chemical Inc.'s Website.

Maeda, Y., et al., "Effect of Antiplasticization on Gas Sorption and Transport. I. Polysulfone," Journal of Polymer Science: Part B: Polymer Physics, vol. 25, 957-980 (1987).

Maeda, Y., et al., "Effect of Antiplasticization on Gas Sorption and Transport. II. Polysulfone," Journal of Polymer Science: Part B: Polymer Physics, vol. 25, 981-1003 (1987).

Maeda, Y., et al., "Effect of Antiplasticization on Gas Sorption and Transport. III Polysulfone," Journal of Polymer Science: Part B: Polymer Physics, vol. 25, 1005-1016 (1987).

Maxwell, et al., "Secondary relaxation processes in polyethylene terephthalate-additive blends: 2. Dynamic mechanical and dielectric investigations," Polymer, vol. 39, No. 26, 6851-6859 (1998).

Van Krevelen, D. W., "Properties of Polymers: Their Correlation with Chemical Structure; Their Numerical Estimation and Prediction from Additive Group Contributions," Elsevier Science B.V., Third Completely Revised Revision (1997).

Robeson & Faucher, J. Polymer Science, Part B 7, 35-40 (1969).

Disclosure Under 35 C.F.R. 1.56 for U.S. Appl. No. 11/850,575 submitted Sep. 27, 2010.

* cited by examiner

MULTILAYER CONTAINER FOR ENHANCED GAS BARRIER PROPERTIES

CROSS-REFERENCE TO RELATED APPLICATIONS

The present application claims the benefit of priority under 35 U.S.C. §119(e) to U.S. Provisional Application No. 60/825,861, filed Sep. 15, 2006, the disclosure of which is incorporated herein by reference in its entirety.

FIELD OF THE INVENTION

This invention relates to a container with enhanced gas barrier properties, and more particularly to enhancing the carbon dioxide and oxygen barrier properties of a container for a packaged beverage, thereby increasing the shelf life of its contents.

BACKGROUND AND OF THE INVENTION

Polyethylene terephthalate and its copolyesters (hereinafter referred to collectively as "PET") are widely used to make containers for carbonated soft drinks, juice, water, and the like due to their excellent combination of clarity, mechanical, and gas barrier properties. In spite of these desirable characteristics, insufficient gas barrier of PET to oxygen and carbon dioxide limits application of PET for smaller sized packages, as well as for packaging oxygen sensitive products, such as beer, juice, and tea products. A widely expressed need exists in the packaging industry to further improve the gas barrier properties of PET.

The relatively high permeability of PET to carbon dioxide limits the use of smaller PET containers for packaging carbonated soft drinks. The permeation rate of carbon dioxide through PET containers is in the range of 3 to 14 cc's per day or 1.5 to 2 percent per week loss rate at room temperature depending on the size of the container. A smaller container has a larger surface area to volume ratio resulting in a higher relative loss rate. For this reason, PET containers are currently used only as larger containers for packaging carbonated soft drinks, while metal cans and glass containers are the choice for smaller carbonated soft drink containers.

The amount of carbon dioxide remaining in a packaged carbonated soft drink determines its shelf life. Normally, carbonated soft drink containers are filled with approximately four volumes of carbon dioxide per volume of water. It is generally accepted that a packaged carbonated soft drink reaches the end of its shelf life when 17.5 percent of the carbon dioxide in the container is lost due to permeation of the carbon dioxide through the container side wall and closure. The permeability of PET to carbon dioxide therefore determines the shelf life of the packaged carbonated beverage and thus, the suitability of PET as a packaging material.

Numerous technologies have been developed or are being developed to enhance the barrier of PET to small gas molecules. For example, external or internal coatings for enhancing the gas barrier of PET containers have been developed. The coating layer is normally a very high barrier layer, either inorganic or organic, and slows down the diffusion of gases. Implementation of this technology, however, requires coating equipment not normally utilized in the manufacture of packaged beverages and therefore requires substantial capital investment, increased energy usage, and increased floor space. In many beverage packaging plants that are already crowded, the additional space is not an option.

Barrier additives have reportedly been incorporated into polymers to increase their modulus and gas barrier properties through an antiplasticization mechanism. In these instances, however, the structure of the container is a monolayer.

In WO 01/12521, Plotzker et al. propose the use of additives selected from 4-hydroxybenzoates and related molecules to increase the gas barrier properties of PET. This published patent application discloses barrier additives of the following structure:

HO—AR—CO—NHR3—COO—AR—OH,
HO—AR—CONHR2NHCO—AR—OH

In the foregoing structure, AR is selected from substituted or unsubstituted phenylene or naphthalene and R1, R2, and R3 are selected from the group consisting of C1 to C6 alkyl groups, a phenyl group, and a naphthyl group.

The foregoing additives described in the art provide only moderate improvement in PET barrier, less than 2.1 times (×) for oxygen barrier for the best examples with a 5 weight percent loading level. At this loading level, however, PET experiences substantial degradation and a significant drop in intrinsic viscosity (IV). Although lowering the level of additive reduces the degradation of PET, it also reduces the barrier improvement factor, so much so that no real benefit exists in using these additives in packaging carbonated soft drinks or oxygen sensitive food. Part of the IV loss is due to the addition of the small molecular additive. Additional IV loss results when additives contain functional groups capable of reacting with PET and causing the break down of the molecular weight. Additives with reactive functional groups usually are more soluble in PET and thus do not impart haziness in the bottle. PET with a significantly lower IV cannot be used in blow molding containers, such as beverage containers. Furthermore, lower IV PET makes containers with poor mechanical performance, such as creep, drop impact, and the like. Still further, PET containers made from lower IV PET have poor stress cracking resistance, which is undesirable in container applications.

PET has been modified or blended with other components to enhance the gas barrier of the PET. Examples include polyethylene naphthalate (PEN)/PET copolymers or blends, isophthalate (IPA) modified PET, PET blended with polyethylene isophthalate (PEI) or a polyamide, such as nylon, and PET modified with resorcinol based diols. For a PET copolymer to achieve moderate barrier enhancement of 2× or higher, the modification is normally more than 10 to 20 weight or mole percent of the total co-monomers. When PET is modified to such a high level, the stretching characteristics of the PET are changed dramatically such that the normal PET container preform design could not be used in the manufacture of containers. Using these PET copolymers to mold conventional PET container preforms results in preforms that can not be fully stretched and the ultimate containers are very difficult, if not impossible, to make. Even if such a container can be made, it does not show improved barrier performance and shows deteriorated physical performance such that it can not be used to package carbonated soft drinks. U.S. Pat. Nos. 5,888,598 and 6,150,450 disclose redesigned PET container preforms with thicker side walls to compensate for the increased stretch ratio. This thicker preform, however, requires new molds which require additional capital investment. The thicker preform is also made at a lower rate of productivity because it takes longer to cool and heat the thicker wall preform. Furthermore, PET blends with polyamide such as nylon developed yellowness and haze and are not clear like conventional PET.

Multi-layered containers have also been developed with a high barrier layer sandwiched in between two or more PET layers. The material used for the high barrier layer is generally a polymer other than PET, such as nylon, polyglycolic acid, EVOH, PEN, and the like. Due to this difference in material, multi-layered containers often have delamination issues, impacting the appearance and both the barrier and mechanical performance of the containers.

Thus, there is a need in the art to enhance the barrier performance of PET for use in applications that will require enhanced barrier, such as in the packaging of carbonated beverages and oxygen sensitive beverages and foods, in a manner that does not cause substantial degradation of the PET, does not substantially impact the stretch ratio of the PET, and does not negatively impact the clarity of the PET.

SUMMARY OF THE INVENTION

This invention addresses the above-described needs by providing a polymer container with enhanced gas barrier properties.

In a particular embodiment, a multilayer container comprises at least two outer layers comprising a polymer matrix and at least one barrier layer disposed between the at least two outer layers. The at least one barrier layer comprises a first polymer composition comprising a polymer matrix and a low molecular weight additive. In another particular embodiment, a multilayer container comprises at least one intermediate layer between the at least one barrier layer and the at least two outer layers.

Particular embodiments of this invention provide polymer containers, such as polyester containers, with enhanced gas barrier, and in particular, enhanced gas barrier to carbon dioxide and oxygen. This makes certain embodiments of the invention particularly suited for packaging carbonated soft drinks and oxygen sensitive beverages and foods. Particular embodiments achieve this enhanced gas barrier while maintaining acceptable physical properties and clarity.

Other objects, features, and advantages of the invention will be apparent from the following detailed description and claims.

DETAILED DESCRIPTION OF THE INVENTION

This invention encompasses a polymer container with enhanced gas barrier properties and a method for making a polymer container with enhanced gas barrier properties.

Embodiments of this invention, including the structure and composition of container, methods for making them, and their uses are described below and illustrated in the accompanying figures.

The present invention provides a multilayer container having enhanced gas barrier properties. As is well known to those skilled in the art, both single and multilayer containers can be made by blow molding a container preform. Examples of suitable preform and container structures are disclosed in U.S. Pat. No. 5,888,598, the disclosure of which is expressly incorporated herein by reference in its entirety.

Figure 1:
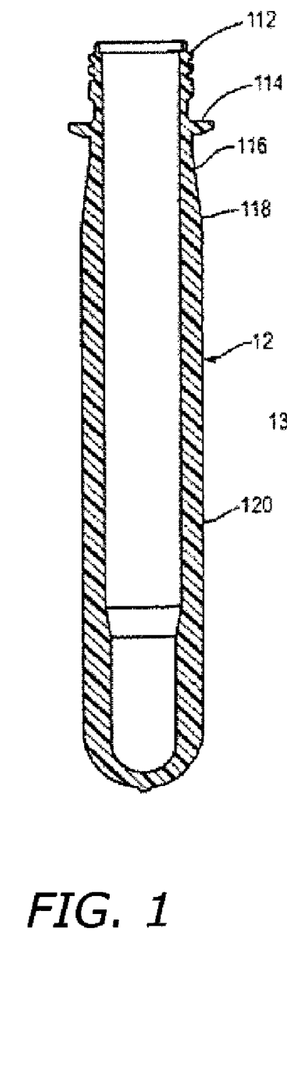
FIG. 1 is a sectional elevation view of a molded container preform made in accordance with an embodiment of this invention.
Figure 2:
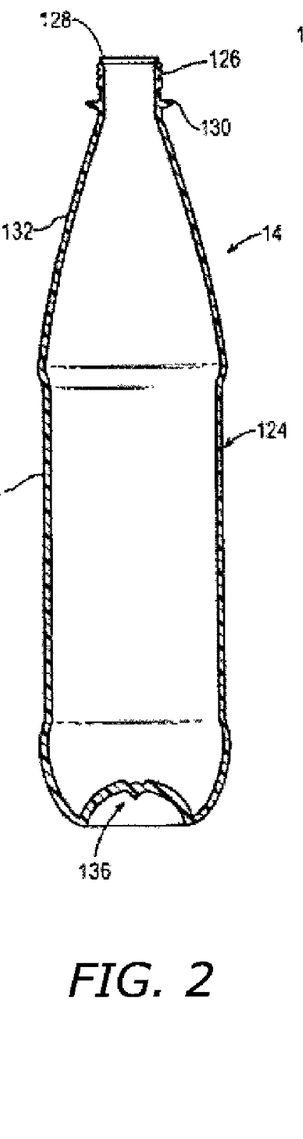
FIG. 2 is a sectional elevation view of a blow molded container made from the preform of FIG. 1 in accordance with an embodiment of this invention.
Figure 3:
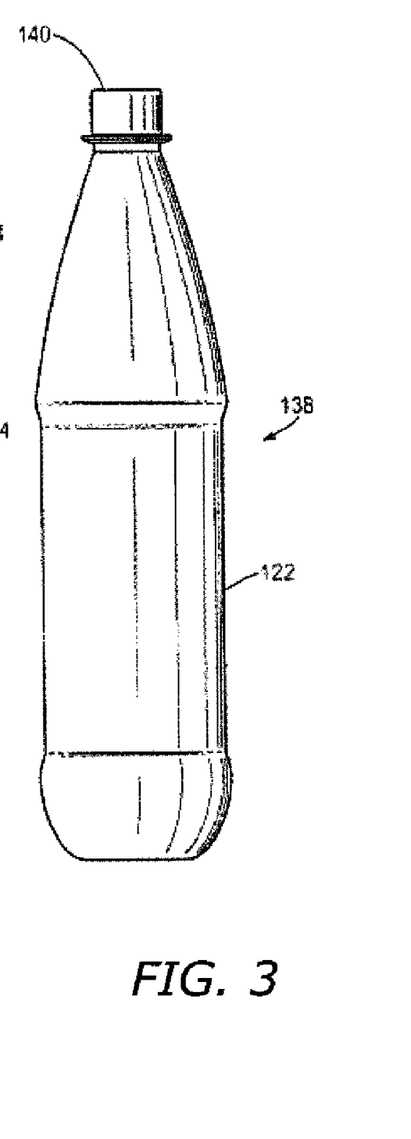
FIG. 3 is a perspective view of a packaged beverage made in accordance with an embodiment of this invention.

In accordance with embodiments of this invention, a container preform 12 is illustrated in FIG. 1 and a container 14 made with such a preform is illustrated in FIG. 2 and FIG. 3. This preform 12 is made by injection molding a polymer matrix and comprises a threaded neck finish 112 which terminates at its lower end in a capping flange 114. Below the capping flange 114, there is a generally cylindrical section 116 which terminates in a section 118 of gradually increasing external diameter so as to provide for an increasing wall thickness. Below the section 118 there is an elongated body section 120.

The preform 12 illustrated in FIG. 1 can be stretch blow molded to form the container 14. The container 14 comprises a shell 124 comprising a threaded neck finish 126 defining a mouth 128, a capping flange 130 below the threaded neck finish, a tapered section 132 extending from the capping flange, a body section 134 extending below the tapered section, and a base 136 at the bottom of the container. The container 14 is suitably used to make a packaged beverage 138, as illustrated in FIG. 3. The packaged beverage 138 includes a beverage such as a carbonated soda beverage disposed in the container 14 and a closure 140 sealing the mouth 128 of the container.

The preform 12, container 14, and packaged beverage 138 are but examples of applications using the preforms of the present invention. It should be understood that the process and apparatus of the present invention can be used to make preforms and containers having a variety of configurations. Suitable containers include, but are not limited to, bottles, drums, carafes, coolers, and the like.

Figure 4A:
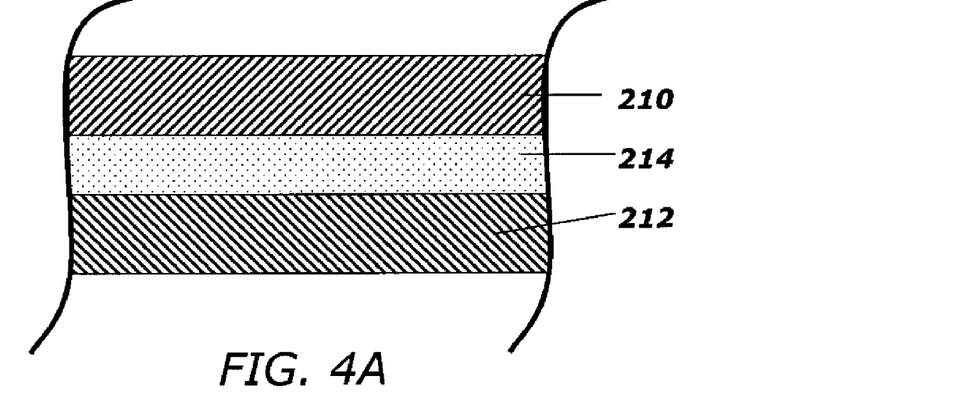
FIG. 4 is a cross-sectional view of the layers within the multilayer container for a 3-layer container (A), 5-layer container (B), and 7-layer container (C) in accordance with embodiments of this invention.
Figure 4B:
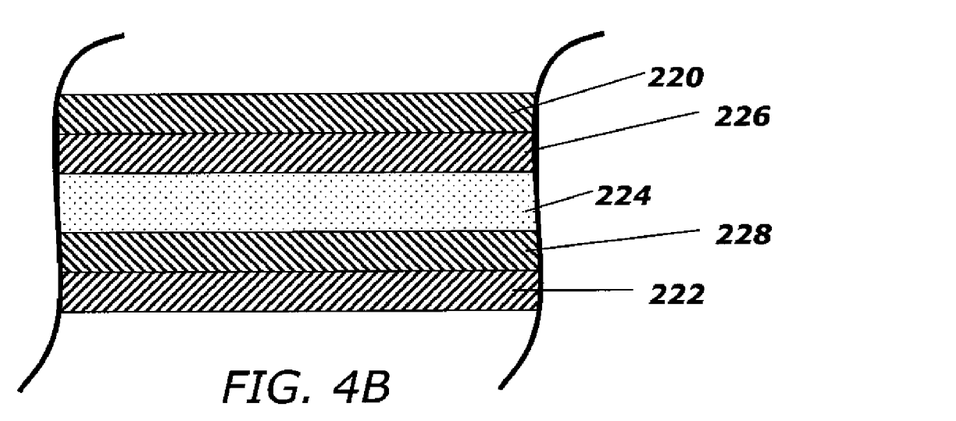
Figure 4C:
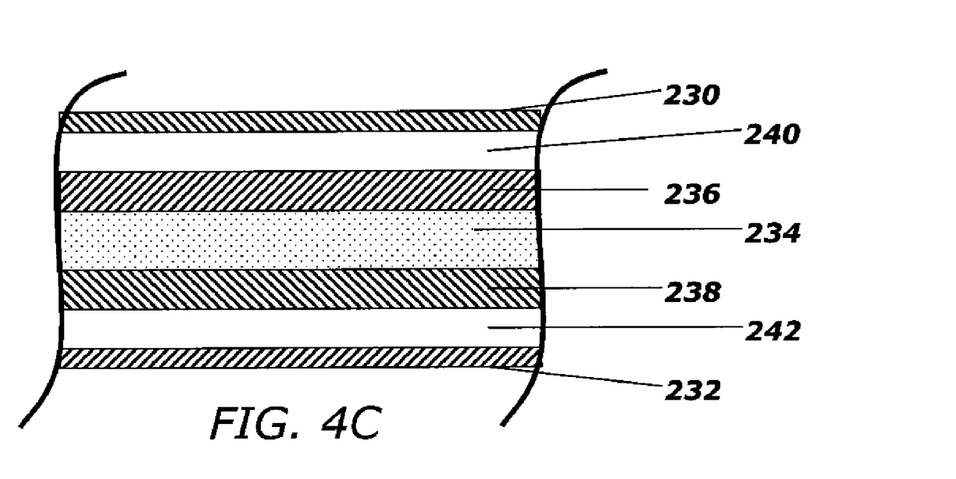

The container 14 desirably comprises a plurality of layers and can include any number of layers, limited only by the capabilities of available coextrusion equipment. FIGS. 4A, 4B, and 4C illustrate the multiple layers of the container in accordance with different embodiments of this invention. In a particular embodiment, the container 14 comprises at least two outer layers comprising about 99 to about 20 weight percent of the container and one or more barrier layers comprising about 1 to about 80 weight percent of the container. In another particular embodiment, the container 14 comprises at least two outer layers comprising about 99 to about 60 weight percent of the container and one or more barrier layers comprising about 1 to about 40 weight percent of the container. In still another particular embodiment, the container 14 comprises at least two outer layers comprising about 99 to 80 weight percent of the container and one or more barrier layers comprising about 1 to about 20 weight percent of the container.

In a particular embodiment shown in FIG. 4A, the container 14 comprises two outer layers 210, 212 and one barrier layer 214. The outer layers 210, 212 help maintain the structural integrity of the container 14 while the barrier layer 214 enhances the gas barrier properties of the container. Generally, the two outer layers 210, 212 comprise a polymer matrix or a polymer matrix with recycled content, while the one barrier layer 214 comprises a first polymer composition comprising a polymer matrix, or a polymer matrix with recycled content, and a low molecular weight additive. The compositions of the layers are discussed in more detail hereinafter.

In another particular embodiment shown in FIG. 4B, the container 14 comprises two outer layers 220, 222, and one or more barrier layers and one or more intermediate layers 224-228. As described above, the outer layers 220, 222 help maintain the structural integrity of the container 14 and prevent egress of the low molecular weight additive from the one or more barrier layers, while the one or more barrier layers 224-228 enhance the gas barrier properties of the container. The one or more intermediate layers 224-228 may serve multiple functions, such as providing further structural integrity to the container 14, providing an adhesive to hold the two outer layers 220, 222 and one or more barrier layers 224-228 together, or providing further gas barrier enhancement to the container. In one embodiment, the container 14 comprises one barrier layer 224 and two intermediate layers 226, 228. In another embodiment, the container 14 comprises two barrier layers 226, 228 and one intermediate layer 224. It should be understood that the one or more barrier layers and one or more intermediate layers 224-228 may be disposed between the two outer layers 220, 222 of the container 14 in any order determined to be suitable by one of ordinary skill in the art, as demonstrated in Table 1. As described above, the two outer layers 220, 222 generally comprise a polymer matrix or optionally a polymer matrix with recycled content while the one or more barrier layers 224-228 comprise a first polymer composition comprising a polymer matrix, or optionally a polymer matrix with recycled content, and a low molecular weight additive. The one or more intermediate layers 224-228, independent of one another, may comprise a polymer matrix, a polymer matrix with recycled content, a polymer matrix with an additive, a polymer matrix with recycled content and an additive, or an adhesive layer.

TABLE 1

Composition of Layers in a Multiple Layer Container

| 5 Layer Container | 7 Layer Container |
| --- | --- |
| Outer Layer | Outer Layer |
| Barrier/Intermediate Layer | Barrier/Intermediate Layer |
| Barrier/Intermediate Layer | Barrier/Intermediate Layer |
| Barrier/Intermediate Layer | Barrier/Intermediate Layer |
| Outer Layer | Barrier/Intermediate Layer |
|  | Barrier/Intermediate Layer |
|  | Outer Layer |

In yet another particular embodiment shown in FIG. 4C, the container 14 comprises two outer layers 230, 232, and one or more barrier layers and one or more intermediate layers 234-242. As described with the previous embodiment, the outer layers 230, 232 help maintain the structural integrity of the container 14 and inhibit egress of the low molecular weight additive from the one or more barrier layers 234-242, while the one or more barrier layers 234-242 enhance the gas barrier properties of the container. The one or more intermediate layers 234-242 may serve multiple functions, such as providing further structural integrity to the container 14, providing an adhesive to hold the two outer layers 230, 232, one or more barrier layers 234-242, and other intermediate layers 234-242 together, or providing further gas barrier enhancement to the container. In one embodiment, the container 14 comprises one barrier layer 234 and four intermediate layers 236-242. In another embodiment, the container 14 comprises two barrier layers 236, 238 and three intermediate layers 232, 240, 242. In yet another embodiment, the container 14 comprises three barrier layers 234, 240, 242 and two intermediate layers 236, 238. It should be understood that the one or more barrier layers and one or more intermediate layers 234-242 may be disposed between the two outer layers 230, 232 of the container 14 in any order determined to be suitable by one of ordinary skill in the art, as demonstrated in Table 1. As described above, the two outer layers 230, 232 generally comprise a polymer matrix or optionally a polymer matrix with recycled content while the one or more barrier layers 234-232 comprise a first polymer composition comprising a polymer matrix, or optionally a polymer matrix with recycled content, and a low molecular weight additive. The outer layers 210, 212 also inhibit egress of the low molecular weight additive from the barrier layer 214. The low molecular weight additive can be volatile and in some embodiments would diffuse out of the barrier layer into the atmosphere if not for the outer layers 210, 212. The one or more intermediate layers 234-242, independent of one another, may comprise a polymer matrix, a polymer matrix with recycled content, a polymer matrix with an additive, a polymer matrix with recycled content and an additive, or an adhesive layer.

Suitable polymers for use in the outer layers of embodiments of this invention may comprise any polymer with a melting or processing temperature in excess of 100° C. Non-limiting examples include polyesters, polyamides, polyolefins, polylactides, polyimides, and copolymers thereof. In a particular embodiment, the polymer matrix comprises PET. Suitable polymers for use in the intermediate and barrier layers of embodiments of this invention include polymers with glass transition temperatures above room temperature. Non-limiting examples include polyesters, polyester copolymers, polyamides, polyethylene naphthalate (PEN), polyethylene isophthalate, copolymers thereof, and the like. PET copolymers are particularly useful because they are used for many barrier applications such as films and containers.

PET copolymers suitable for use in embodiments of this invention comprise a diol component having repeat units from ethylene glycol and a diacid component having repeat units from terephthalic acid. In particular embodiments, the PET copolymer has less than 20 percent diacid modification, less than 10 percent glycol modification, or both, based on 100 mole percent diacid component and 100 mole percent diol component, respectively. Such PET copolymers are well known. PET copolymers suitable for use in embodiments of this invention also may comprise a polyester with recycled content.

Polymers, including polyesters such as PET copolymers, have free volume between the polymer chains. As is known to those skilled in the art, the amount of free volume in polymers such as PET copolymers determines their barrier to gas molecules. The lower the free volume, the lower the gas diffusion, and the higher the barrier to gas molecules. Desirably, the one or more barrier layers of embodiments of this invention comprise a low molecular weight additive that is at least partially disposed in the free volume between the polymer chains of the first polymer composition. Not wishing to be bound by any theory, it is believed that the low molecular weight additive acts as an anti-plasticizer in the polymer matrix, eliminating the free volume, thereby preventing rotation of the polymer chains and enhancing the barrier properties of the polymer composition.

The low molecular weight additive improves the barrier properties of the container when present in the container in an amount in the range of about 0.2 to about 10 weight percent of the container. In another embodiment, the low molecular weight additive is present in the container in an amount in the range of about 2 to about 10 weight percent of the container.

In still another embodiment, the low molecular weight additive is present in the container in an amount in the range of about 2 to about 5 weight percent of the container.

When the low molecular weight additive is present in the container at loading levels above 10 weight percent of the container, the barrier improvement factor (BIF) is substantial; however, the polymer composition's properties deteriorate and make forming a container more difficult. The BIF is a measure of enhanced gas barrier properties (the ratio of the gas transmission rate of a polymer composition without an additive to the gas transmission rate of a polymer composition with an additive). Not wishing to be bound by any theory, it is believed that when the low molecular weight additive is present in the container at loading levels significantly above 10 weight percent of the container, the additive acts as a plasticizer, thereby permitting rotation of the polymer chains and reducing the barrier properties of the polymer composition. When the low molecular weight additive is present in the container at loading levels below 0.2 weight percent of the container, the BIF is insignificant.

The amount of the low molecular weight additive present in the at least one barrier layer (a), the amount of the at least one barrier layer present in the container (b), and the amount of the low molecular weight additive present in the container (c) are interrelated as follows:

$a \cdot b = c$

The lower limit of the low molecular weight additive present in the at least one barrier layer (a) is limited by the lower limit of the at least one barrier layer present in the container (b). The upper limit of the low molecular weight additive present in the at least one barrier layer (a) is limited by the low molecular weight additive's ability to compound with the polymer matrix in the first polymer composition of the at least one barrier layer. Accordingly, in a particular embodiment, the low molecular weight additive is present in the at least one barrier layer of the container in an amount in the range of about 0.25 to about 25 weight percent of the barrier layer, in another embodiment in the range of about 3.75 to about 25 weight percent of the barrier layer, and in still another embodiment in the range of about 3.75 to about 12.5 weight percent of the barrier layer.

In a particular embodiment, when the low molecular weight additive is present in the container in an amount in the range of about 0.2 to about 10 weight percent of the container, the low molecular weight additive is present in the barrier layer in an amount in the range of about 0.25 to about 25 weight percent of the barrier layer. Furthermore, the at least two outer layers comprise about 99 to about 60 weight percent of the container, and the at least one barrier layer comprises about 1 to about 40 weight percent of the container.

In yet another particular embodiment, when the low molecular weight additive is present in the container in an amount in the range of about 2 to about 10 weight percent of the container, the low molecular weight additive is present in the barrier layer in an amount in the range of about 3.75 to about 25 weight percent of the barrier layer. Furthermore, the at least two outer layers comprise about 99 to about 80 weight percent of the container, and the at least one barrier layer comprises about 1 to about 20 weight percent of the container.

In still another particular embodiment, when the low molecular weight additive is present in the container in an amount in the range of about 2 to about 5 weight percent of the container, the low molecular weight additive is present in the barrier layer in an amount in the range of about 3.75 to about 12.5 weight percent of the barrier layer. Furthermore, the at least two outer layers comprise about 99 to about 60 weight percent of the container, and the at least one barrier layer comprises about 1 to about 40 weight percent of the container.

A multilayer container comprising at least one barrier layer with a high loading of additive can circumvent many of the negative consequences normally associated with using high levels of additive. Notably, because the modulus, stretch ratio, top-load characteristics are determined in part by the outer and any intermediate layer of the container, which have little or no barrier additive, the outer and any intermediate layers of the container offset the negative impact the one or more barrier layers would otherwise have on the mechanical properties of the container.

Drawbacks often associated with multilayer containers can be eliminated by using similar materials in each layer, which would minimize or eliminate the risk of delamination and its associated negative effects. Furthermore, the advantages of a multilayer container can be realized by using additives in a barrier layer that would be too volatile for inclusion in a single layer container. Normally, the use of volatile additives in containers can lead to fouling of the molds, and eventually deterioration of part quality, impacting both the appearance and performance of the container. For example conventional injection molding of polymers having high melting and processing temperatures, such as PET, with low molecular weight additives results in significant plate-out, which occurs when there is deposition of material onto the surfaces of the injection molding apparatus during processing of the polymers. Plate-out reduces the running time of the injection molding apparatus, resulting in costly delays in production for cleaning. Using a multilayer container can significantly reduce or eliminate the plate-out caused by low molecular weight additives because the low molecular weight additive is contained within two outer layers without the low molecular weight additive, preventing contact between the low molecular weight additive and the surfaces of the injection molding apparatus.

As described above, the first polymer composition of the at least one barrier layer desirably comprises a low molecular weight additive. Generally, the low molecular weight additive comprises a compound with a molecular weight below about 2000 daltons, below about 1500 daltons, or below about 1000 daltons. In a particular embodiment, the low molecular weight additive comprises an ester, diester, or polyester of an aromatic or aliphatic nature; an amide, diamide, or polyamide of an aromatic or aliphatic nature, non-limiting examples of which include acetanilide, terephthalamide, and nylon 6; a cyclic ester with one or more ester groups, non-limiting examples of which include lactone, polylactone, caprolactone, and lactide; a cyclic amide with one or more amide groups, non-limiting examples of which include lactam, polylactam, caprolactam, and alanine anhydride; or mixtures thereof.

In a particular embodiment, the low molecular weight additive comprises a purine derivative, as described in the co-pending non-provisional patent application Ser. No. 11/532,361 filed on Sep. 15, 2006, entitled "Container and Composition for Enhanced Gas Barrier Properties," which claims priority to the provisional patent application 60/723, 751 filed on Oct. 15, 2005, by inventor's Yu Shi, et al. The disclosures of these patent applications are expressly incorporated herein by reference in their entirety.

A purine derivative has the chemical structure of Formula I wherein $R_1$, $R_3$, $R_5$, and $R_7$, independent of one another, comprise a hydrogen, arylamino, alkoxy, aryloxy, alkenyl, alkynyl, or a straight, chained, branched, or cyclic alkyl, alkenyl, alkynyl, aryl, heteroaryl, heterocyclic, or acyl group;

wherein t, $t_1$, x, $x_1$, $x_2$, y, and z, independent of one another, are a single bond or a double bond; wherein t', x', y', and z', independent of one another, are 0 or 1; wherein x", y", and w', independent of one another, are 1 or 2;

wherein when x is a double bond, $x_1$ is a single bond; wherein when $x_1$ is a double bond, x and $x_2$ are single bonds; wherein when $x_2$ is a double bond, $x_1$ and $t_1$ are single bonds; wherein when t is a double bond, $t_1$ and z are single bonds; wherein when z is a double bond, t is a single bond; wherein when $t_1$ is a double bond, t and $x_2$ are single bonds; wherein when x is a double bond, x' is 0; wherein when x or $x_1$ is a double bond, x" is 1; wherein when y is a double bond, y' is 0 and y" is 1; wherein when t or $t_1$ is a double bond, t' is 0; wherein when z and t are single bonds, w' is 2; wherein when z or t is a double bond, w' is 1; wherein when z is a double bond, z' is 0; wherein when x, y, or z, independent of one another, is a single bond, and x', y', or z', independent of one another, is 1;

wherein $R_2$, $R_4$, and $R_6$, independent of one another, may be moieties attached by a single or double bond;

wherein when $R_2$, $R_4$, or $R_6$ is a moiety attached by a single bond, $R_2$, $R_4$ and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group;

wherein when $R_2$, $R_4$, or $R_6$ is a moiety attached by a double bond, $R_2$, $R_4$, or $R_6$, independent of one another, comprise oxygen, sulfur, $CR_8R_9$, $SO_2$, or $NR_{10}$; $R_8$ and $R_9$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group; and $R_{10}$ comprises a hydrogen, arylamino, alkoxy, aryloxy, alkenyl, alkynyl, or a straight, chained, branched, or cyclic alkyl, alkenyl, alkynyl, aryl, heteroaryl, heterocyclic, or acyl group.

wherein when x" is 2, both $R_2$ moieties may be the same or different; wherein when y" is 2, both $R_4$ moieties may be the same or different; and wherein when w' is 2, both $R_6$ moieties may be the same or different.

The moieties described above may further be substituted as known by one skilled in the art with a hydrogen, halogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, and any other viable functional group.

In one embodiment of the compound of Formula I, the purine derivative comprises 7H-purine, having the chemical structure wherein x, $x_2$, y, and t are double bonds; wherein $x_1$, $t_1$ and z are single bonds; wherein x', y', and t' are 0; wherein x", y", z', and w' are 1; and wherein $R_2$, $R_4$, $R_5$, and $R_6$ are hydrogen.

In another embodiment of the compound of Formula I, the purine derivative comprises a compound having the chemical structure of Formula II wherein $t_1$, x, $x_1$, y, and z are single bonds; wherein $x_2$ and t are double bonds; wherein w', x', y', z', x", and y" are 1; wherein t' is 0; wherein $R_2$ and $R_4$, independent of one another, are moieties attached by a double bond comprising oxygen, sulfur, $CR_8R_9$, $SO_2$, or $NR_{10}$; and wherein $R_1$, $R_3$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In another embodiment of the compound of Formula I, the purine derivative comprises theobromine, a purine dione having the chemical structure wherein $t_1$, x, $x_1$, y, and z are single bonds; wherein $x_2$ and t are double bonds; wherein w', x', y', z', x", and y" are 1; wherein t' is 0; wherein $R_1$ and $R_6$ are hydrogen; wherein $R_2$ and $R_4$ are oxygen; and wherein $R_3$ and $R_5$ are methyl.

In another embodiment of the compound of Formula I, the purine derivative comprises caffeine, a purine dione having the chemical structure wherein $t_1$, x, $x_1$, y, and z are single bonds; wherein $x_2$ and t are double bonds; wherein w', x', y', z', x", and y" are 1; wherein t' is 0; wherein $R_6$ is hydrogen; $R_2$ and $R_4$ are oxygen; and $R_1$, $R_3$ and $R_5$ are methyl.

In still another embodiment of the compound of Formula I, the purine derivative comprise theophylline, a purine dione having the chemical structure wherein $t_1$, x, $x_1$, y, and z are single bonds; wherein $x_2$ and t are double bonds; wherein w', x', y', z', x", and y" are 1; wherein t' is 0; wherein $R_5$ and $R_6$ are hydrogen; wherein $R_2$ and $R_4$ are oxygen; and wherein $R_1$ and $R_3$ are methyl.

In still yet another embodiment of the compound of Formula I, the purine derivative comprises xanthine, a purine dione having the chemical structure wherein $t_1$, x, $x_1$, y, and z are single bonds; wherein $x_2$ and t are double bonds; wherein w', x', y', z', x", and y" are 1; wherein t' is 0; wherein $R_1$, $R_3$, $R_5$ and $R_6$ are hydrogen; and $R_2$ and $R_4$ are oxygen.

In another embodiment of the compound of Formula I, the purine derivative comprises a compound having the chemical structure of Formula III wherein x, $x_1$, y, and t, and $t_1$ are single bonds; wherein $x_2$ and z are double bonds; wherein t', w', x', y', x", and y" are 1; wherein z' is 0; wherein $R_2$ and $R_4$, independent of one another, are moieties attached by a double bond comprising oxygen, sulfur, $CR_8R_9$, $SO_2$ or $NR_{10}$; and wherein $R_1$, $R_3$, $R_6$, and $R_7$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In another embodiment of the compound of Formula I, the purine derivative comprises a compound having the chemical structure of Formula IV wherein x, $x_1$, y, t, $t_1$, and z are single bonds; wherein $x_2$ is a double bond; wherein t', w', x', y', z', x", and y" are 1; wherein $R_2$, $R_4$, and $R_6$, independent of one another, are moieties attached by a double bond comprising oxygen, sulfur, $CR_8R_9$, $SO_2$, or $NR_{10}$; and wherein $R_1$, $R_3$, $R_5$, and $R_7$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In yet another embodiment of the compound of Formula I, the purine derivative comprises uric acid, a purine dione having the chemical structure wherein x, $x_1$, y, t, $t_1$, and z are single bonds; wherein $x_2$ is a double bond; wherein t', w', x', y', z', x", and y" are 1; wherein $R_1$, $R_3$, $R_5$ and $R_7$ are hydrogen; wherein $R_2$, $R_4$, and $R_6$ are oxygen.

In another embodiment of the compound of Formula I, the purine derivative comprises a compound having the chemical structure of Formula V wherein x, $x_1$, $t_1$, and z are single bonds; wherein $x_2$, t, and y are double bonds; wherein w', x', z', x", and y" are 1; wherein y' and t' are 0; wherein $R_4$ is a moiety attached by a double bond comprising oxygen, sulfur, $CR_8R_9$, $SO_2$, or $NR_{10}$; and wherein $R_1$, $R_2$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In yet another embodiment of the compound of Formula I, the purine derivative comprises guanine, having the chemical structure wherein x, $x_1$, $t_1$, and z are single bonds; wherein $x_2$, t, and y are double bonds; wherein w', x', z', x", and y" are 1; wherein y' and t' are 0; wherein $R_1$, $R_5$, and $R_6$ are hydrogen; wherein $R_2$ is amino; and wherein $R_4$ is oxygen.

In another embodiment, the purine derivative comprises a compound having the chemical structure of Formula VI wherein x, $x_2$, y and z are double bonds; wherein $x_1$, t, and $t_1$ are single bonds; wherein t', w', x", and y" are 1; wherein x', y', and z' are 0; and wherein $R_2$, $R_4$, $R_6$, and $R_7$ comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In still yet another embodiment of the compound of Formula I, the purine derivative comprises adenine, having the chemical structure wherein x, $x_2$, y and z are double bonds; wherein $x_1$, t, and $t_1$ are single bonds; wherein t', w', x", and y" are 1; wherein x', y', and z' are 0; wherein $R_2$, $R_6$, and $R_7$ are hydrogen; and wherein $R_4$ is an amino.

In another embodiment of the compound of Formula I, the purine derivative comprises a compound having the chemical structure of Formula VII wherein x, $x_2$, and t are double bonds; wherein $t_1$, $x_1$, y and z are single bonds; wherein w', y', z', x", and y" are 1; wherein t' and x' are 0; wherein $R_2$ is a moiety attached by a double bond comprising oxygen, sulfur, $CR_8R_9$, $SO_2$, or $NR_{10}$; and wherein $R_3$, $R_4$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In another embodiment of the compound of Formula I, the purine derivative comprises a compound having the chemical structure of Formula VIII wherein $x_2$, y and t are double bonds; wherein x, $x_1$, $t_1$, and z are single bonds; wherein w', x', z', x", and y" are 1; wherein t' and y' are 0; wherein $R_4$ is a moiety attached by a double bond comprising oxygen, sulfur, $CR_8R_9$, $SO_2$, or $NR_{10}$; and wherein $R_1$, $R_2$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In another embodiment of the compound of Formula I, the purine derivative comprises 7-methylguanine, having the chemical structure wherein $x_2$, y and t are double bonds; wherein x, $x_1$, $t_1$, and z are single bonds; wherein w', x', z', x", and y" are 1; wherein t' and y' are 0; wherein $R_1$ and $R_6$ are hydrogen; wherein $R_2$ is amino; wherein $R_4$ is oxygen, and wherein $R_5$ is methyl.

In another particular embodiment of the compound of Formula I, the purine derivative comprises thioguanine, having the chemical structure wherein $x_2$, y and t are double bonds; wherein x, $x_1$, $t_1$, and z are single bonds; wherein w', x', z', x", and y" are 1; wherein t' and y' are 0; wherein $R_1$, $R_5$, and $R_6$ are hydrogen; wherein $R_2$ is amino; and wherein $R_4$ is sulfur.

In yet another embodiment of the compound of Formula I, the purine derivative comprises 6-mercaptopurine, having the chemical structure wherein $x_2$, y and t are double bonds; wherein x, $x_1$, $t_1$, and z are single bonds; wherein w', x', z', x", and y" are 1; wherein t' and y' are 0; wherein $R_1$, $R_2$, $R_5$, and $R_6$ are hydrogen; and wherein $R_4$ is sulfur.

In still another embodiment of the compound of Formula I, the purine derivative comprises hypoxanthine, having the chemical structure wherein $x_2$, y and t are double bonds; wherein x, $x_1$, $t_1$, and z are single bonds; wherein w', x', z', x", and y" are 1; wherein t' and y' are 0; wherein $R_1$, $R_2$, $R_5$, and $R_6$ are hydrogen; and wherein $R_4$ is oxygen.

In another embodiment of the compound of Formula I, the purine derivative comprises a compound having the chemical structure of Formula IX wherein $x_1$, y, $t_1$, and z are double bonds; wherein x, $x_2$, and t are single bonds; wherein w', x', x", and y" are 1; wherein t', y', and z' are 0; and wherein $R_1$, $R_2$, $R_4$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl aryl, heteroaryl, heterocyclic, or acyl group.

In still another embodiment of the compound of Formula I, the purine derivative comprises 1H-purine, having the chemical structure wherein $x_1$, y, $t_1$, and z are double bonds; wherein x, $x_2$, and t are single bonds; wherein w', x', x", and y" are 1; wherein t', y', and z' are 0; wherein $R_1$, $R_2$, $R_4$, and $R_6$ are hydrogen.

In still yet another particular embodiment of the compound of Formula I, the purine derivative comprises diaminopurine, having the chemical structure wherein $x_1$, y, $t_1$, and z are double bonds; wherein x, $x_2$, and t are single bonds; wherein w', x', x", and y" are 1; wherein t', y', and z' are 0; wherein $R_1$ and $R_6$ are hydrogen; and wherein $R_2$ and $R_4$ are amino.

It should be understood that the foregoing are merely examples of suitable low molecular weight additives that should not be construed as in any way imposing limitations upon the scope thereof.

As described above, multilayer containers are useful for making containers having enhanced gas barriers. Such containers are made by forming the above described polymer compositions into the desired multilayer container by conventional methods such as melt forming. Suitable melt forming processes include, but are not limited to, co-injection molding, co-extrusion, thermal forming and compression molding. The particularly preferred method for making the containers of this invention is stretch blow molding. Such methods are well known to those skilled in the art and are described in U.S. Pat. Nos. 6,596,213; 5,914,138; and 5,011,720; and in U.S. Patent Publication Number 2004/0247739. The disclosures of these references are expressly incorporated herein by reference in their entirety.

Methods for incorporating the low molecular weight additive into the container and polymer composition also are provided herein. Such methods also well known to those skilled in the art. For example, an additive can be fed directly into the polymer matrix during the injection molding process, preblended with the polymer resin prior to injection molding, or incorporated at high concentrations with the polymer as masterbatch and then blended with the polymer resin prior to injection molding of the container.

Figure 5:
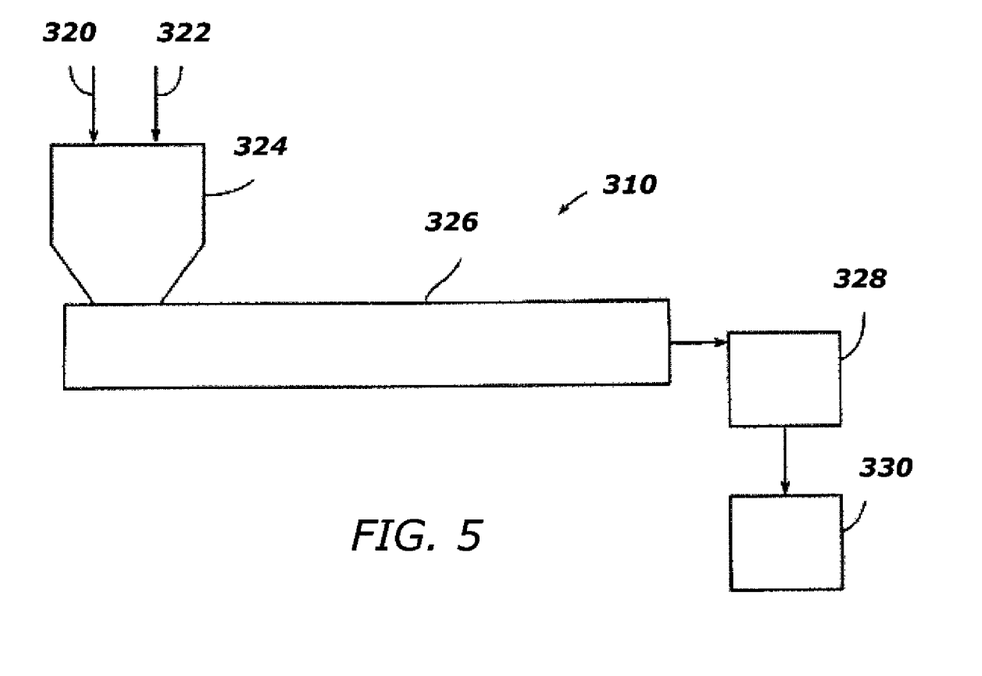
FIG. 5 is a schematic diagram of a system for making a polymer container with enhanced gas barrier in accordance with an embodiment of this invention.

FIG. 5 illustrates a system 310 in accordance with an embodiment of this invention for making a rigid container preform 12 (illustrated in FIG. 1) and a rigid container 14

(illustrated in FIG. 2) from the preform. As shown in FIG. 5, PET 320 and a low molecular weight additive 322, such as a purine derivative, are added to a feeder or hopper 324 that delivers the components to a hot melt extruder 326 in which the components are melted and blended. PET for forming the at least two outer layers similarly is fed to the hot melt extruder 326 (not pictured). The hot melt extruder 326 co-extrudes the molten PET and the molten mixture of PET 320 and low molecular weight additive 32, forcing the flowing streams to flow along concentric annular flow paths into an injection molding device 328 to form the multilayer preform 12. The multilayer preform 12 is cooled and removed from the injection molding device 328 and delivered to a stretch blow molding device 330 which stretch blow molds the multilayer preform 12 into a finished rigid multilayer container 14.

The melt residence time of the preform production is preferably less than five minutes and more preferably from about one to about three minutes. The melt temperatures are desirably from about 270 to about 300° C. and more desirably from about 270 to about 290° C. The melt residence time begins when the materials enter the melt extruder 326 and start melting, and ends after injection of the molten materials into the injection mold to form the preform 12.

In a particular embodiment, the injection molding process can be modified by pressurizing the mold cavity to minimize plate-out, as described in the co-pending U.S. provisional patent application 60/825,844 filed on Sep. 15, 2006, entitled "Pressurized Tooling for Injection Molding and Method of Using," by Schultheis, et al., the disclosure of which is expressly incorporated herein by reference in its entirety. Pressurizing the mold cavity changes the dynamics of the processing cycle by reducing or completely eliminating the ability of additives to diffuse through the copolymer and deposit on the inner surface of the mold. The desired pressure of the mold cavity can be optimized for a particular polymer material, polymer matrix, or additive.

The modified injection molding process (not pictured) includes the additional step of pressurizing a mold by introducing a pressurized gas into a mold cavity in the mold, wherein the mold cavity defines the shape of the container preform; co-extruding the polymer compositions into the mold cavity; cooling the polymer compositions to form the multilayer container preform; and removing the multilayer container preform from the mold cavity.

The pressurized gas may be any gas that does not detrimentally affect the polymer composition. Non-limiting examples include air and its individual components, oxygen, nitrogen, and carbon dioxide; the noble gases, argon, neon, helium, and xenon; and mixtures thereof. In a particular embodiment, the mold cavity is pressurized to a pressure in the range of about 1 to about 1000 psig.

The present invention is further illustrated by the following example, which is not to be construed in any way as imposing limitations upon the scope thereof. On the contrary, it is to be clearly understood that resort may be had to various other embodiments, modifications, and equivalents thereof which, after reading the description therein, may suggestion themselves to those skilled in the art without departing from the spirit of the present invention and/or the scope of the appended claims.

Example

A commercially available polyester container grade resin (INVISTA, Spartanburg, S.C.) was dried in a vacuum oven at 140° C. overnight to a moisture level below 50 ppm. The low molecular weight additive, caffeine, was dried in a vacuum oven at 70° C. overnight to remove surface moisture. Multilayer containers were made with the PET as the outer two layers and the PET in combination with the caffeine as the barrier layer. The barrier layer comprised 20 weight percent of the container. Caffeine comprised 15 weight percent of the barrier layer (3 weight percent of the container). A lab scale Arburg unit cavity injection molding machine was used for injection molding. The preforms were blow molded with a Sidel SBO 2/3 blow molding machine to make acceptable contour containers. A 21.1 g preform made a 12 oz container.

The carbon dioxide transmission rates of the containers were then measured using a Mocon 2/60 model instrument at 22.2° C. and 50% relative humidity (RH) with the $N_2/H_2$ (99:1) and air purging rates of 10 mol/min on opposite sides. The results are shown in Table 2. The barrier improvement factor (BIF) was defined as the ratio of the carbon dioxide transmission rate of the multilayer polyester container comprising a low molecular weight additive in the barrier layer to the carbon dioxide transmission rate of the multilayer polyester container without additive in the barrier layer.

TABLE 2

Carbon dioxide transmission rate of 12 oz multilayer PET containers

| Additive | Caffeine in Barrier Layer (Wt %) | Barrier Layer in Container (Wt %) | Caffeine in Container Preform (Wt %) | Caffeine in Blow-Molded Container (Wt %) | $CO_2$ BIF |
|---|---|---|---|---|---|
| N/A | 0 | 20 | 0 | 0 | 1.00 |
| Caffeine | 15 | 20 | 3 | 3 | 1.3 |

The carbon dioxide BIF of the 12 oz multilayer containers improved significantly with the addition of caffeine to the PET composition of the barrier layer.

It should be apparent that the foregoing relates only to the preferred embodiments of the present invention and that numerous changes and modification may be made herein without departing from the spirit and scope of the invention as defined by the following claims and equivalents thereof.

What is claimed is:

1. A multilayer stretch blow molded container comprising:
   at least two outer layers comprising a thermoplastic polymer comprising a polyester, polyamide, polyolefin, polyimide, polylactide, or derivatives thereof; and
   at least one barrier layer disposed between the at least two outer layers,
   wherein the at least one barrier layer comprises a first polymer composition comprising a polymer matrix and a low molecular weight gas barrier enhancing additive wherein the polymer matrix comprises a thermoplastic polymer comprising a polyester, polyamide, polyethylene naphthalate, polyethylene isophthalate, or a copolymer thereof, and wherein the low molecular weight gas barrier enhancing additive is a purine derivative having a molecular weight below 1000 daltons.

2. The multilayer container of claim 1, further comprising at least one intermediate layer disposed between the at least one barrier layer and the at least two outer layers.

3. The multilayer container of claim 1, wherein
   a) the at least two outer layers comprise about 99 to about 20 weight percent of the multilayer container;
   b) the at least one barrier layer comprises about 1 to about 80 weight percent of the multilayer container; and c) the low molecular weight gas barrier enhancing additive is present in the multilayer container in an amount in the range of about 0.2 to about 10 weight percent of the multilayer container.

4. The multilayer container of claim 1, wherein the low molecular weight gas barrier enhancing additive is present in the multilayer container in an amount in the range of about 0.2 to about 10 weight percent of the multilayer container and in the at least one barrier layer in an amount in the range of about 0.25 to about 25 weight percent of the at least one barrier layer.

5. The multilayer container of claim 4, wherein
a) the at least two outer layers comprise about 99 to about 60 weight percent of the multilayer container; and
b) the at least one barrier layer comprises about 1 to about 40 weight percent of the multilayer container.

6. The multilayer container of claim 1, wherein the low molecular weight gas barrier enhancing additive is present in the multilayer container in an amount in the range of about 2 to about 10 weight percent of the multilayer container and in the at least one barrier layer in an amount in the range of about 3.75 to about 25 weight percent of the at least one barrier layer.

7. The multilayer container of claim 6, wherein
a) the at least two outer layers comprise about 99 to about 80 weight percent of the multilayer container; and
b) the at least one barrier layer comprises about 1 to about 20 weight percent of the multilayer container.

8. The multilayer container of claim 1, wherein the low molecular weight gas barrier enhancing additive is present in the multilayer container in an amount in the range of about 2 to about 5 weight percent of the multilayer container and in the at least one barrier layer in an amount in the range of about 3.75 to about 12.5 weight percent of the at least one barrier layer.

9. The multilayer container of claim 8, wherein
a) the at least two outer layers comprise about 99 to about 60 weight percent of the multilayer container; and
b) the at least one barrier layer comprises about 1 to about 40 weight percent of the multilayer container.

10. The multilayer container of claim 1, wherein the at least two outer layers comprise polyethylene terephthalate.

11. The multilayer container of claim 1, wherein the at least two outer layers comprise a poly(ethylene terephthalate) based copolymer having less than 20 percent diacid, or less than 10 percent glycol modification, or both, based on 100 mole percent diacid component and 100 mole percent diol component.

12. The multilayer container of claim 1, wherein the at least two outer layers comprise a polyethylene terephthalate with recycled content.

13. The multilayer container of claim 1, wherein the polymer matrix of the first polymer composition comprises polyethylene terephthalate.

14. The multilayer container of claim 1, wherein the polymer matrix of the first polymer composition comprises a poly(ethylene terephthalate) based copolymer having less than 20 percent diacid, or less than 10 percent glycol modification, or both, based on 100 mole percent diacid component and 100 mole percent diol component.

15. The multilayer container of claim 1, wherein the polymer matrix of the first polymer composition comprises a polyethylene terephthalate with recycled content.

16. The multilayer container of claim 1, wherein the purine derivative comprises a purine dione comprising caffeine, theophylline, theobromine, xanthine, uric acid, or mixtures thereof.

17. The multilayer container of claim 1, wherein the purine derivative comprises adenine, guanine, 7-methylguanine, thioguanine, 6-mercaptopurine, hypoxanthine, diaminopurine, 7H-purine, 1H-purine, or mixtures thereof.

18. The multilayer container of claim 2, wherein the at least one intermediate layer comprises a polyester terephthalate, a polyester terephthalate with recycled content, or an adhesive layer.

19. The multilayer container of claim 2, wherein the at least one intermediate layer comprises the first polymer composition of the at least one barrier layer.

20. A packaged beverage comprising a beverage disposed in the multilayer container of claim 1 and a seal for sealing the beverage in the multilayer container.

21. The packaged beverage of claim 20, wherein the beverage is a carbonated beverage.

* * * * *